Feb. 6, 1962  E. LUDLOW ETAL  3,020,379
ELECTRIC HEATING PANEL
Filed Sept. 21, 1959
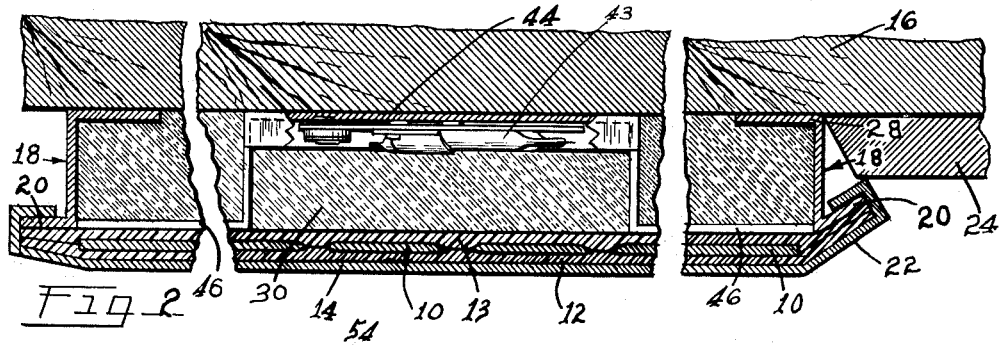
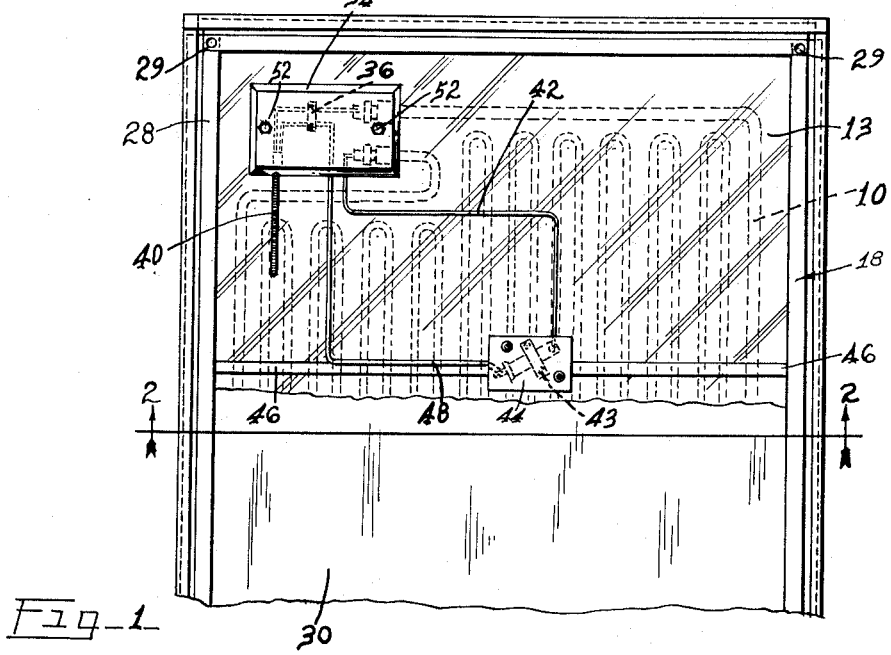
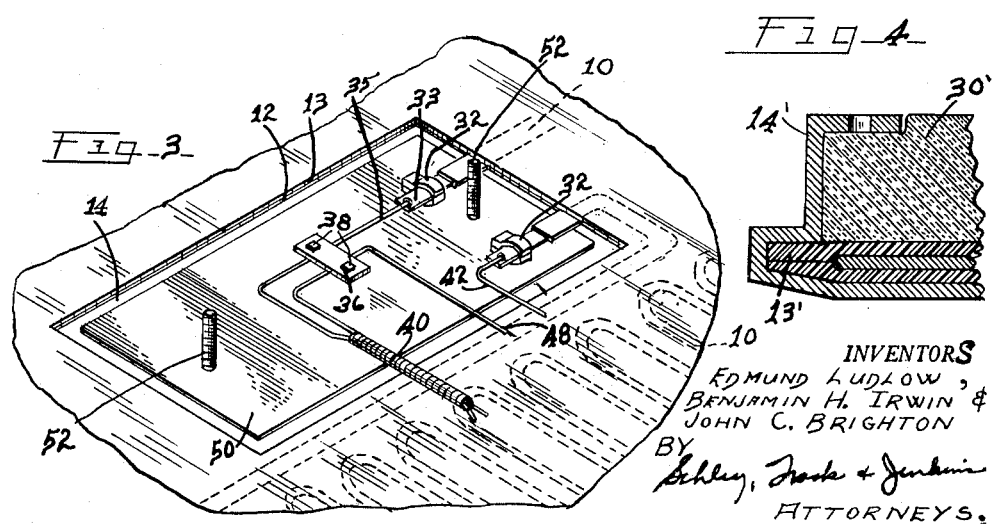
INVENTORS
EDMUND LUDLOW,
BENJAMIN H. IRWIN &
JOHN C. BRIGHTON
BY
Ashley, Franks & Jenkins
ATTORNEYS.

United States Patent Office 3,020,379
Patented Feb. 6, 1962

3,020,379
ELECTRIC HEATING PANEL
Edmund Ludlow, Benjamin H. Irwin, and John C. Brighton, Columbus, Ind., assignors to Arvin Industries, Inc., Columbus, Ind., a corporation of Indiana
Filed Sept. 21, 1959, Ser. No. 841,226
7 Claims. (Cl. 219—19)

This invention relates to an electric heating panel, and more particularly to an electric heating panel adapted to be mounted on a ceiling or other wall surface.

Heretofore, wall mounted electric heating units, particularly ceiling mounted units, have been generally available only in combination with air-moving means such as power-driven blowers. The necessity for such combination type units was predicated upon the inability of such electric heating units to efficiently and rapidly dissipate the heat that they developed. In the absence of such fans, these units produced an overheating of the ceiling, creating a fire hazard and thus demanding the incorporation of such fans into ceiling mounted electric-heating units.

The presence of such heat dissipating means naturally increases the cost of producing such units and detracts from the general attractive appearance of the room in which they are used. It further increases the difficulty of mounting such units on a ceiling and often precludes the possibility of mounting the combination unit in a recessed position within the ceiling.

It is thus the general object of our invention to provide an electric heating panel which will overcome the difficulties and disadvantages described above. More specifically, it is an object of our invention to provide an electric heating panel having a high watt density which will rapidly and efficiently dissipate the heat therefrom, which will have a durable construction, which can be easily mounted on a wall surface including a ceiling, and which will be waterproof.

According to the preferred form of our invention, there is provided a heat-generating foil grid encapsulated between a pair of insulating sheets. The laminate is bonded to a heat-conductive metal sheet giving rigidity to the panel and adapted to rapidly dissipate the heat away from the foil grid. The edges of the metal sheet are crimped over the edges of the pair of insulating sheets and over the edge of a bracket adapted to be connected to a ceiling or other wall surface upon which the heating panel is to be mounted. Conveniently, the bracket further serves to hold a layer of insulation between the insulating sheet opposite the metal sheet and the wall surface upon which the panel is to be mounted.

Desirably, the electrical connections for the panel are encased in a substantially waterproof housing mounted on the rear face of the panel, and include a limiting thermostat switch for controlling the amount of heat dissipated from the heating panel toward the wall surface upon which said panel is mounted. The thermostat switch is insulated from the grid and is provided with a heat-conductive plate for sensing the temperature of the wall surface upon which the panel is mounted.

Other features and embodiments of our invention will become more apparent from the detailed description which follows and from the accompanying drawings in which:

FIG. 1 is a fragmentary rear elevation of an electric heating panel embodying our invention with portions thereof broken away;

FIG. 2 is a fragmentary vertical section taken on the line 2—2 of FIG. 1, but showing said heating panel mounted on a ceiling;

FIG. 3 is a fragmentary isometric view of the terminal housing for the electric circuit; and FIG. 4 is a fragmentary vertical section of a modified form of our heating panel.

Our electric heating panel is adapted to be mounted on a wall surface, such as a ceiling, and may be mounted on such surface in either a recessed, flushed, or projecting position, as desired. As shown in FIG. 1, heat is generated in our panel by an electrically conductive foil grid 10, conveniently formed of a sheet of aluminum having a thickness in the range of .0003–.001 inch. The grid 10 is in the form of a narrow continuous strip of foil forming a sinuous conductive path to present a heat generating surface having an extent substantially as large as the extent of the panel. A pair of thin sheets 12 and 13 of insulating material, such as "Mylar" (polyethylene terephthalate), are laminated to the opposed faces of the grid 10 with their margins extending outwardly beyond the edges of the foil grid and being bonded together to completely encapsulate said grid. The laminate is intimately bonded to a piece of sheet metal 14 having an extent slightly greater than the extent of the laminate. The sheet metal serves as a heat sink for conducting and dissipating the heat away from the grid 10, and further serves to give the panel the desired structural rigidity.

As shown in FIG. 2, in order to mount the panel on a wall surface 16, we provide a mounting bracket 18 conveniently in the form of a continuous Z-shaped channel extending around the periphery of the panel adjacent the edges thereof. One leg 20 of the bracket 18 is disposed against the insulating sheet 13 and extends outwardly toward the edge thereof. The marginal edges of the metal sheet 14 are bent over the edges of the insulating sheets 12 and 13 and the bracket leg 20 so as to provide a watertight seal extending peripherally around the panel. As shown in FIG. 2, the bracket 18 has a second inwardly directed leg 28 parallel to the general plane of the panel and adapted to hold a layer of insulation 30 against the insulating sheet 13 of the laminate. Thus, with the insulating sheet 13 and the layer of insulation 30 providing a relatively thick heat barrier, and the metal sheet 14 serving as a heat sink, a very small amount of heat will be conducted away from the grid 10 toward the wall surface 16.

As shown to the right in FIG. 2, the peripheral margins of the panel may be bent rearwardly, as at 22, so as to bear against a ceiling or wall tile 24 to provide a substantially flush mounting therewith. Alternatively, as shown to the left in FIG. 2, the peripheral margin of the panel may remain in a plane parallel to the plane of the wall 16. This latter configuration is most suitable for mounting the heating panel in a recessed position within the wall itself.

Conveniently, where a continuous bracket 18 is employed, the corners of the bracket legs 28 are bent over each other, as indicated at 29 in FIG. 1, and provided with apertures for the reception of screws or other means for mounting the panel on a wall. Instead of employing a continuous bracket 18, it is to be understood, of course, that a plurality of individual brackets may also be employed without departing from the spirit and scope of our invention.

In the modification illustrated in FIG. 4, the metal sheet 14' has its margins bent into a generally Z-shaped cross-section and thus serves to eliminate the use of the bracket 18. In this modification, the margins of the metal sheet 14' also serve as means for connecting the heating panel to a wall and for holding the layer of insulation 30' against the insulating sheet 13'.

As shown in FIG. 3, the electrical connections for the foil grid 10 are formed by cutting out a section of the insulating sheets 12 and 13 to expose the rear face of the metal sheet 14 and the terminal ends of the grid 10. To facilitate forming the terminals on the grid 10, the adhesive interconnecting the insulating layer 12 to the metal sheet 14 is masked off in the area of said terminals, as is the adhesive interconnecting the grid 10 to the insulating sheet 13. The terminal ends of the grid may be provided with any suitable type of connectors 32. One type of connectors which we have used with great success is described in copending U.S. application Ser. No. 819,403, filed June 10, 1959, now Patent No. 2,945,083. An electric lead 35 extends from one of the terminals 33 under a strain relief plate 36 mounted on the metal sheet as by studs 38 and is carried in a flexible conduit 40. The lead 42 from the other grid terminal 33 extends through the insulation 30 to a normally closed limiting thermostat switch 43 mounted on the back face of the panel. Any convenient type of thermostat switch may be employed. However, it is essential that such switch have a heat-conductive metal plate 44, which serves as a heat sink presented outwardly so as to bear against, or be disposed in juxtaposition to, the wall surface 16 upon which the heating panel is mounted. It is further essential that the switch 43 be thermally insulated from the grid 10. To this end, we provide legs 46 of a nonconductive material, such as a phenolic resin, which extend outwardly from the switch 43 and are rigidly connected to the bracket 18. The switch 43 is provided with a lead 48 extending back under the strain relief plate 36 and into the conduit 40 carrying the lead 35.

In order to insulate the electrical connections of the grid from the metal sheet 14, a sheet of insulating material 50 is disposed on the exposed section of the rear face of the metal sheet 14. A pair of studs 52 mounted on the sheet 14 extend upwardly through the insulation 50 and serve as mounting posts for a cover 54 adapted to be drawn against the insulating sheet 13 to provide waterproof housing for the electrical connections of the panel. As shown in FIG. 1, the cover 54 is provided with openings through which the conduit 40 and the wires 42 and 48 extend.

In the operation of our heating panel, the heat generated by the grid 10 passes through the insulating sheet 12 to the heat-conductive metal sheet 14 where it is rapidly dissipated into a room. Because of the relative heat conductivity of the sheet 14 and the insulating layer 30, substantially all of the heat developed by the grid 10 will pass outwardly through the sheet 14. Any heat that does move in an opposite direction through the insulating layer 30, however, will raise the temperature of the wall surface 16 upon which the panel is mounted and actuate the thermostat switch 43 to open the circuit to the grid 10. But, due to the substantial differences in their heat conductivity, substantially larger portions of the heat generated by the grid will move outwardly through the sheet 14 rather than being conducted in an opposite direction toward the wall surface 16.

We claim as our invention:

1. An electric heating panel, comprising an electrically conductive foil grid laminated between a pair of flexible insulating sheets, the margins of said sheets extending outwardly beyond the periphery of said grid and being bonded together, a rigid heat-conductive metal sheet bonded to one of said pair of insulating sheets and having its marginal edges bent over the margins of the pair of insulating sheets, and means interposed between the bent over margins of the metal sheet and the pair of insulating sheets for bracing said panel and connecting it to a wall surface in position to dispose said foil sheet in spaced relation thereto between said wall surface and said metal sheet, said means being disposed in spaced relation to said insulating sheets within the extent of said grid.

2. An electric heating panel as set forth in claim 1 in which said means comprises an elongated Z-shaped bracket connected to said metal sheet having an outwardly projecting leg received between the bent over margin of the metal sheet and the pair of insulating sheets to form a peripheral seal therewith and an inwardly extending leg in spaced parallel relation to said pair of insulating sheets.

3. An electric heating panel as set forth in claim 1 in which said means comprises a Z-shaped bracket having an outwardly extending leg received between the bent over margin of the metal sheet and the pair of insulating sheets to form a peripheral seal therewith and an inwardly extending leg in spaced parallel relation to said pair of insulating sheets, and a layer of insulation carried against the insulating sheet adjacent said inwardly extending bracket leg by said inwardly projecting bracket leg.

4. An electric heating panel, comprising an electrically conductive foil grid laminated between a pair of insulating sheets, the margins of said sheets extending outwardly beyond the periphery of said grid and being bonded together, a rigid heat-conductive metal sheet bonded to one of said pair of insulating sheets and having its marginal edges bent over the margins of the pair of insulating sheets, a mounting bracket interposed between the bent over margins of the metal sheet and the pair of insulating sheets for bracing said panel and connecting it to a wall surface in position to dispose said foil sheet in spaced relation thereto between said wall surface and said metal sheet, said bracket being disposed in spaced relation to said insulating sheets within the extent of said grid, and a normally closed thermostat switch operatively connected to the foil grid and insulated therefrom, said switch being mounted on the rear face of the panel and responsive to temperature changes in the area the opposed sides of which are determined by said wall surface and the insulating sheet adjacent thereto.

5. An electric heating panel, comprising an electrically conductive foil grid laminated between a pair of insulating sheets, the margins of said sheets extending outwardly beyond the periphery of said grid and being bonded together, a heat-conductive metal sheet bonded to one of said pair of insulating sheets and having its marginal edges bent over the margins of the pair of insulating sheets, a mounting bracket interposed between the bent over margins of the metal sheet and the pair of insulating sheets for bracing said panel and connecting it to a wall surface in position to dispose said foil sheet in spaced relation thereto, and a normally closed thermostat switch operatively connected to the foil grid and insulated therefrom, said switch being mounted on the rear face of the panel and being provided with a heat-conductive plate adapted to abut the wall surface to conduct the heat therefrom to said thermostat switch for actuating the same.

6. An electric heating panel, comprising an electrically conductive foil grid laminated between a pair of insulating sheets, the margins of said sheets extending outwardly beyond the periphery of said grid and being bonded together, a heat-conductive metal sheet bonded to one of said pair of insulating sheets and having its marginal edges bent over the margins of the pair of insulating sheets, a mounting bracket interposed between the bent over margins of the metal sheet and the pair of insulating sheets, a mounting bracket interposed between the bent over margins of the metal sheet and the pair of insulating sheets for bracing said panel and connecting it to a wall surface in position to dispose said foil sheet in spaced relation thereto, and a normally closed thermostat switch operatively connected to the foil grid and insulated therefrom, said switch being mounted on the rear face of the panel on insulating legs connected to said bracket and being carried on said legs in spaced relation to the foil grid.

7. An electric heating panel, comprising an electrically conductive foil grid laminated between a pair of flexible insulating sheets, the margins of said sheets extending outwardly beyond the periphery of said grid and being bonded together, a heat-conductive metal sheet bonded to one of said pair of insulating sheets and having its marginal edges bent over the margins of the pair of insulating sheets, a plurality of studs projecting outwardly from said metal sheet through an opening in the grid and the pair of insulating sheets, a cover mounted on said studs and forming with one of said insulating sheets a substantially watertight housing in which the grid terminals are disposed, and means bindingly retained between the bent over margins of the metal sheet and the pair of insulating sheets for bracing said panel and connecting it to a wall surface in position to dispose said foil sheet in spaced relation thereto, said bent over margins of the metal sheet and the pair of insulating sheets forming with the means interposed therebetween a peripherally extending substantially watertight seal.

References Cited in the file of this patent

UNITED STATES PATENTS

| | | |
|---|---|---|
| 2,256,706 | Fox | Sept. 23, 1941 |
| 2,460,625 | Ellis | Feb. 1, 1949 |
| 2,502,148 | Grothouse | Mar. 28, 1950 |
| 2,505,117 | Hoffmann | Apr. 25, 1950 |
| 2,700,095 | Needham | Jan. 18, 1955 |
| 2,719,213 | Johnson | Sept. 27, 1955 |
| 2,859,321 | Garaway | Nov. 4, 1958 |
| 2,945,083 | Ganske et al. | July 12, 1960 |
| 2,971,073 | Eisler | Feb. 7, 1961 |